United States Patent [19]

Hayashi

[11] Patent Number: 5,597,261
[45] Date of Patent: Jan. 28, 1997

[54] COUPLING JOINT FOR AN OPERATIVE LEVER APPARATUS

[75] Inventor: Seita Hayashi, Kanagawa, Japan

[73] Assignee: Kabushiki Kaisha Komatsu Seisakusho, Tokyo, Japan

[21] Appl. No.: 446,622

[22] PCT Filed: Dec. 1, 1993

[86] PCT No.: PCT/JP93/01752

§ 371 Date: May 31, 1995

§ 102(e) Date: May 31, 1995

[87] PCT Pub. No.: WO94/12922

PCT Pub. Date: Jun. 9, 1994

[30] Foreign Application Priority Data

Dec. 1, 1992 [JP] Japan ................. 4-082857 U

[51] Int. Cl.⁶ .............. B25G 3/28; F16B 7/00; F16C 3/00; F16D 3/00
[52] U.S. Cl. .............. 403/354; 403/291; 403/383; 464/51; 464/88; 464/93; 464/182
[58] Field of Search .............. 403/291, 354, 403/383; 464/51, 87, 88, 93, 100, 185, 182; 74/527, 528, 531, 557

[56] References Cited

U.S. PATENT DOCUMENTS 2,312,822  3/1943  Julien et al. ............ 464/87 X
2,855,206  10/1958  Haviland ............... 464/87 X
2,952,143  9/1960  Case ...................... 464/88
3,747,367  7/1973  Muller ................... 464/88 X
4,063,433  12/1977  Chanton .................. 464/88

FOREIGN PATENT DOCUMENTS

53-40658  2/1978  Japan.
62-140636  9/1987  Japan.

*Primary Examiner*—Brian K. Green
*Assistant Examiner*—Bruce A. Lev
*Attorney, Agent, or Firm*—Wenderoth, Lind & Ponack

[57] ABSTRACT

There is provided a coupling joint for coupling a shaft (23) to a rotary axis (25a) of a rotary angle sensor (25) mounted on a valve body. The coupling joint includes an engagement recess portion (40) formed on the shaft, a coupling member (41) engageable with the engagement recess portion, and a projection (42) formed on the rotary shaft for engagement with an angular hole (45) of the coupling member. Also, the coupling member is constructed by a pair of first opposing sides (43) and a pair of second, wave-form or zig-zag opposing sides (44) forming a configuration having an angular opening. The pair of first sides are formed to fit into the engagement recess portion of the shaft. The projection fits between the pair of second sides. With this construction, if the interference between the angular hole of the coupling and the projection is made larger, only a small amount of deformation will result so that the coupling can continue to be fitted in the engagement recess portion without any material spacing developing.

10 Claims, 8 Drawing Sheets

COUPLING JOINT FOR AN OPERATIVE LEVER APPARATUS

BACKGROUND OF THE INVENTION

The present invention relates to a coupling joint for an operative lever apparatus in which an angle of the inclination of a lever is detected by a rotary angle sensor for producing an electrical output representative of the angle.

A known operative lever apparatus of this sort is disclosed in Unexamined Japanese Utility Model Publication No. 62-140636.

Figure 1:
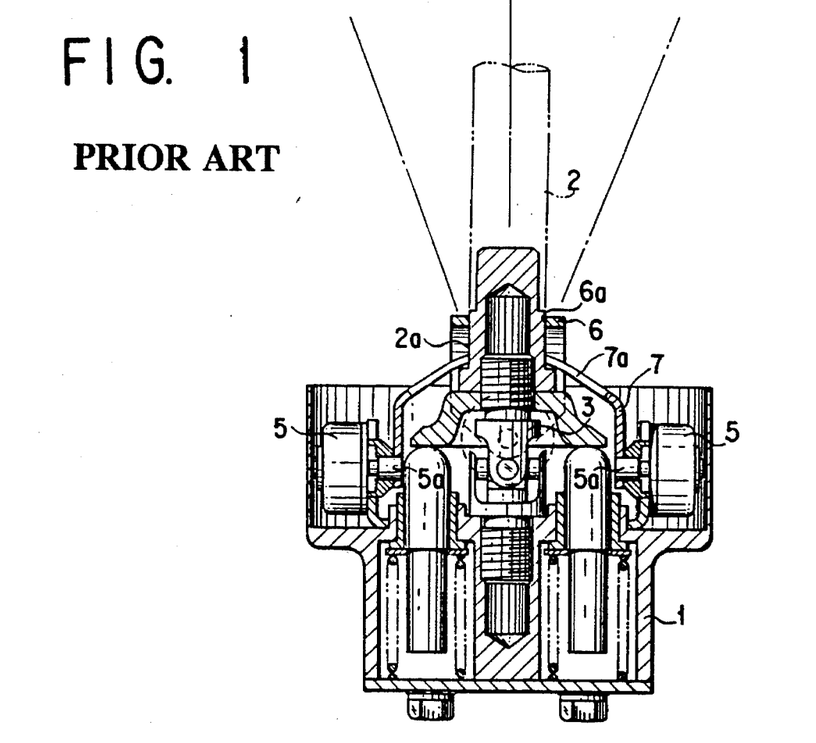
FIG. 1 is a longitudinal sectional view of a conventional operative lever apparatus.
Figure 2:
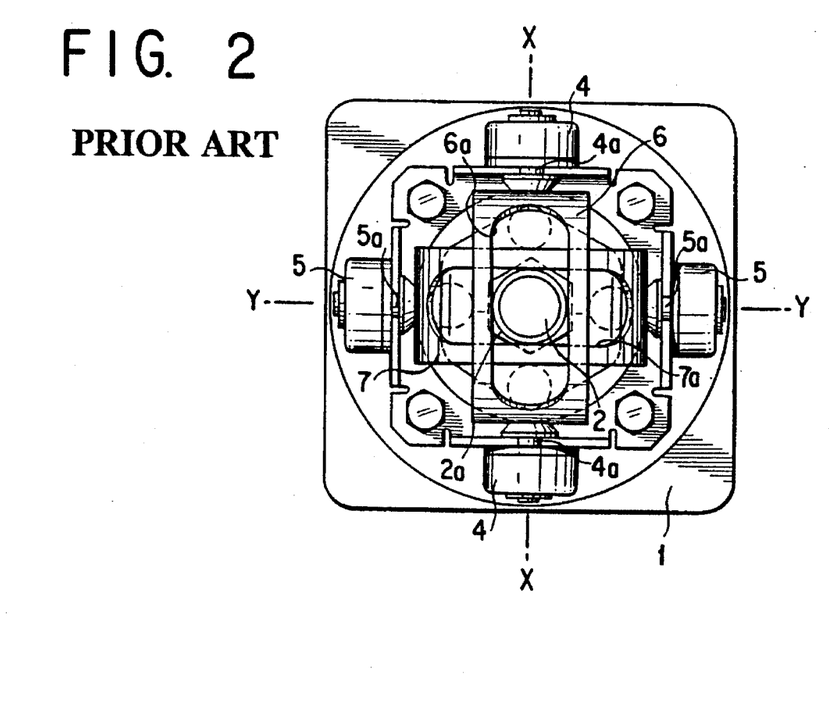
FIG. 2 is a top plan view of the above-mentioned conventional operative lever apparatus.

That is, as shown in FIGS. 1 and 2, such an apparatus 1 has coupled thereto a lever 2 with a universal joint 3 so that the lever 2 may be freely inclined in a direction of X and in a direction of Y. In the apparatus 1, a pair of first rotary angle sensors 4 are provided in the X direction whereas a pair of second rotary angle sensors 5 are provided in the Y direction. A rotary shaft 4a for the pair of first rotary angle sensors 4 are jointed via a first gimbal 6 whereas a rotary shaft 5a for the second pair of rotary angle sensors 5 are jointed via second gimbal 7. The lever 2 is inserted through the respective elongate apertures 6a and 7a of the first and second gimbals 6 and 7 so that when the lever 2 is inclined in the X direction, the second gimbal 7 may be rocked to rotate the rotary shaft 5a of the pair of second rotary angle sensors 5 and that when the lever 2 is inclined in the Y direction, the first gimbal 6 may be rocked to rotate the rotary shaft 4a of the pair of first rotary angle sensors 4.

Figure 3:
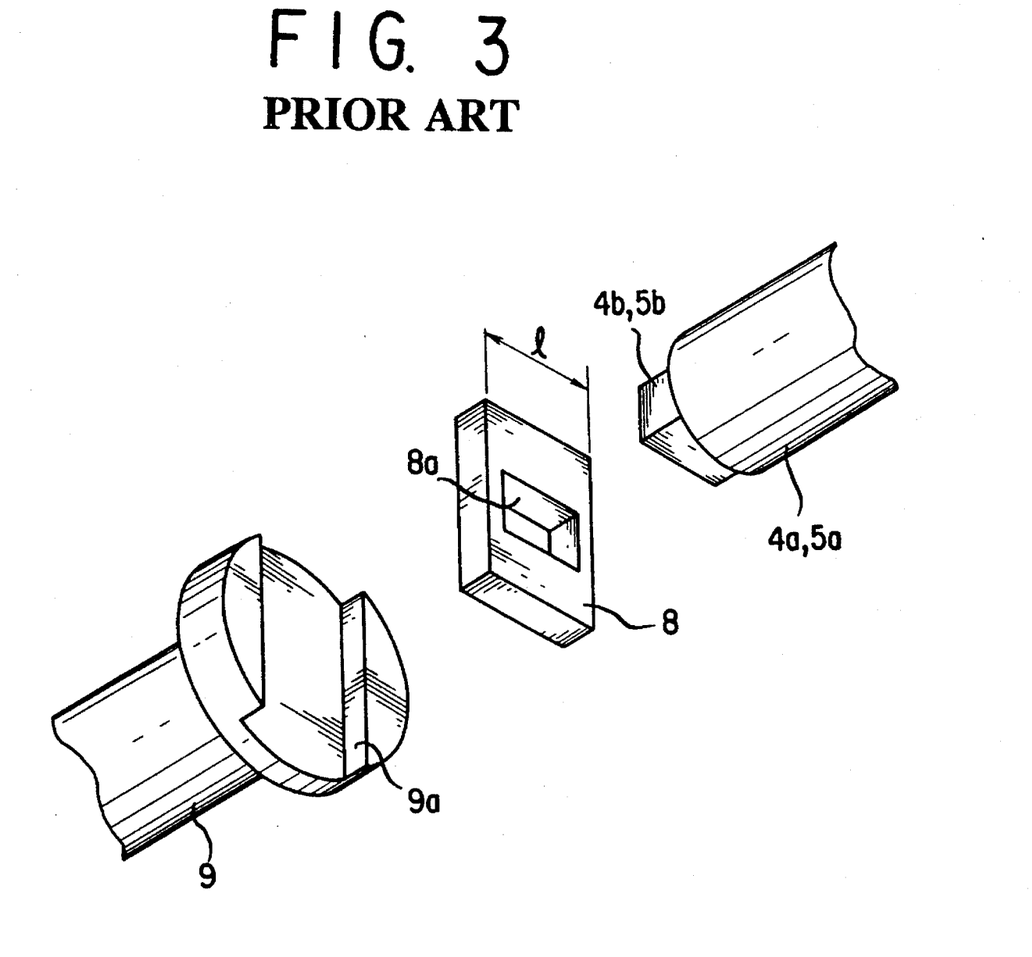
FIG. 3 is a perspective view, as broken away, showing a prior-art coupling joint in the above-mentioned conventional example.

In such an operative lever apparatus, the respective rotary shafts 4a and 5a of the first rotary angle sensors 4 and the second rotary angle sensors 5 are coupled to the respective axial portions of the first and second gimbals 6 and 7 via coupling joints, respectively. These coupling joints may each be a modified Oldham joint which, as shown in FIG. 3, comprises a coupling member 8 in the form of a rectangular plate having a rectangular hole 8a to be fitted with a rectangular projection 4b, 5b of the respective rotary shaft 4a, 5a. A rectangular coupling member 8 is adapted to fit in a recess 9a formed at the end of each shaft 9 of the respective first and second gimbals 6 and 7.

With such a joint coupling, it is necessary that the rotary shaft 4a, 5a and the shaft 9 should be smoothly coupled together so that rotation of the shaft 9 can be transmitted to the first and second sensors 4, 5 with a high degree of precision.

For this reason, there is provided an interference at an engagement portion each between the coupling member 8 and the recess 9a and between the rectangular hole 8a and the projections 4b, 5b.

However, if the interference is made larger at the engagement portion between the rectangular hole 8a of the coupling member 8 and the projection 4b, 5b of the rotary shaft 4a, 5a, when the projection 4b, 5b is being engaged with the rectangular hole 8a, the coupling member 8 tends to deform. Since the opposing surface dimensions will be reduced, it follows that a spacing will be produced between the coupling member 8 and the recess 9a so as to develop a back-lash at an interface thereof.

Figure 4:
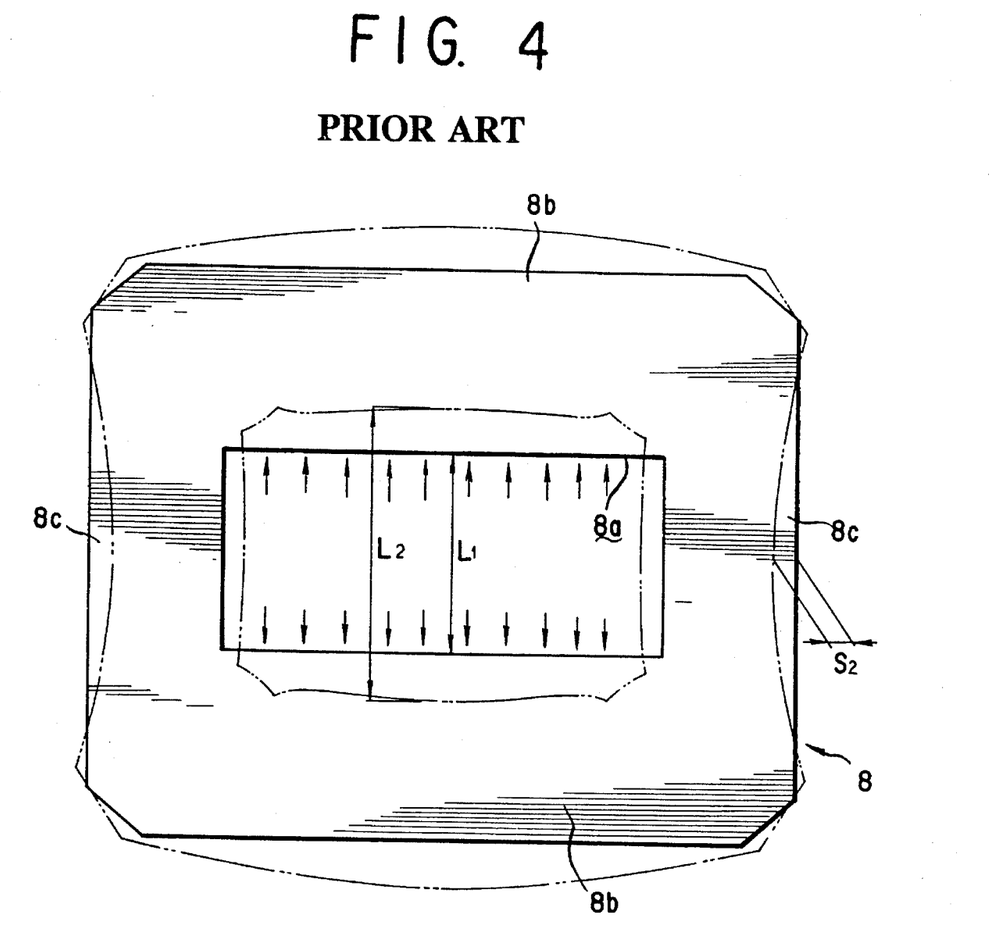
FIG. 4 is a front view of the coupling member of the above-mentioned prior, art coupling joint.

More specifically, as shown in FIG. 4, the coupling member 8 is formed by a pair of first sides 8b and a pair of second sides 8c so as to be rectangular. Then, when the rectangular hole 8a is formed so that its width may be changed from L1 to L2, the amount of deformation S2 of the sides 8c will become larger and produce a spacing between each side 8c and the recess 9a so that a back-lash may be created at an interface between the coupling member 8 and the recess 9a. In order to prevent such a spacing from developing, it is necessary to increase the interference at the coupling portion between the coupling member 8 and the recess. By doing so, however, the ease with which they may be assembled will be reduced.

With the foregoing problems taken into account, it is an object of the present invention to provide a coupling joint for an operative lever apparatus, where if the interference at the engagement portion between the rectangular hole of the coupling member and the projecting portion of the rotary axis of the sensor is increased, the coupling member can be fitted in the engagement recess portion without materially producing a spacing between them, and thus the shaft of the gimbal and the rotary shaft of the rotary angle sensor can be coupled together without materially developing a back-lash at an interface between the coupling member and the projecting portion.

SUMMARY OF THE INVENTION

In order to achieve the foregoing and other objects, there is provided in accordance with the present invention, a coupling joint for coupling a shaft, rotatable by a lever supported on a valve body, to a rotary axis of a rotary angle sensor mounted on the valve body. The coupling joint includes an engagement recess portion formed on the shaft, a coupling member engageable with the engagement recess portion, and a projection formed on the rotary shaft for engagement with an angular hole of the coupling. The coupling member is constructed by a first pair of opposing sides and a second pair of wave-shaped or zig-zag opposing sides. The respective sides form a configuration having an angular hole. The pair of first sides are fitted in the engagement recess portion of the shaft and the projection is fitted between the second sides of the second pair.

With the above-mentioned construction, if an interference at an engagement portion between an angular hole of the coupling member and the projection is made larger, any deformation whatsoever of the coupling member can be reduced so as to enable the coupling member to be fitted in the engagement recess portion without materially developing a space therebetween.

In the aforementioned construction, it is preferable that the engagement recess portion of the shaft should have a configuration which will accommodate a rectangular member. The projection of the rotary shaft should have a rectangular cross-sectional configuration.

Further, it is preferable that the wave-shaped or zig-zag sides of the second pair should be arranged so that they are symmetrical in configuration about a center dividing line of the coupling member.

BRIEF DESCRIPTION OF THE DRAWINGS

The present invention will better be understood from the following detailed description and the drawings attached hereto showing a certain illustrative embodiment of the present invention. In this connection, it should be noted that such an embodiment as illustrated in the accompanying drawings is intended in no way to limit the present invention, but to facilitate an explanation and understanding thereof.

In the accompanying drawings.

DETAILED DESCRIPTION OF THE INVENTION

Hereinafter, a coupling joint for an operating lever according to one embodiment of the present invention will be described with reference to FIGS. 5 through 9.

Figure 5:
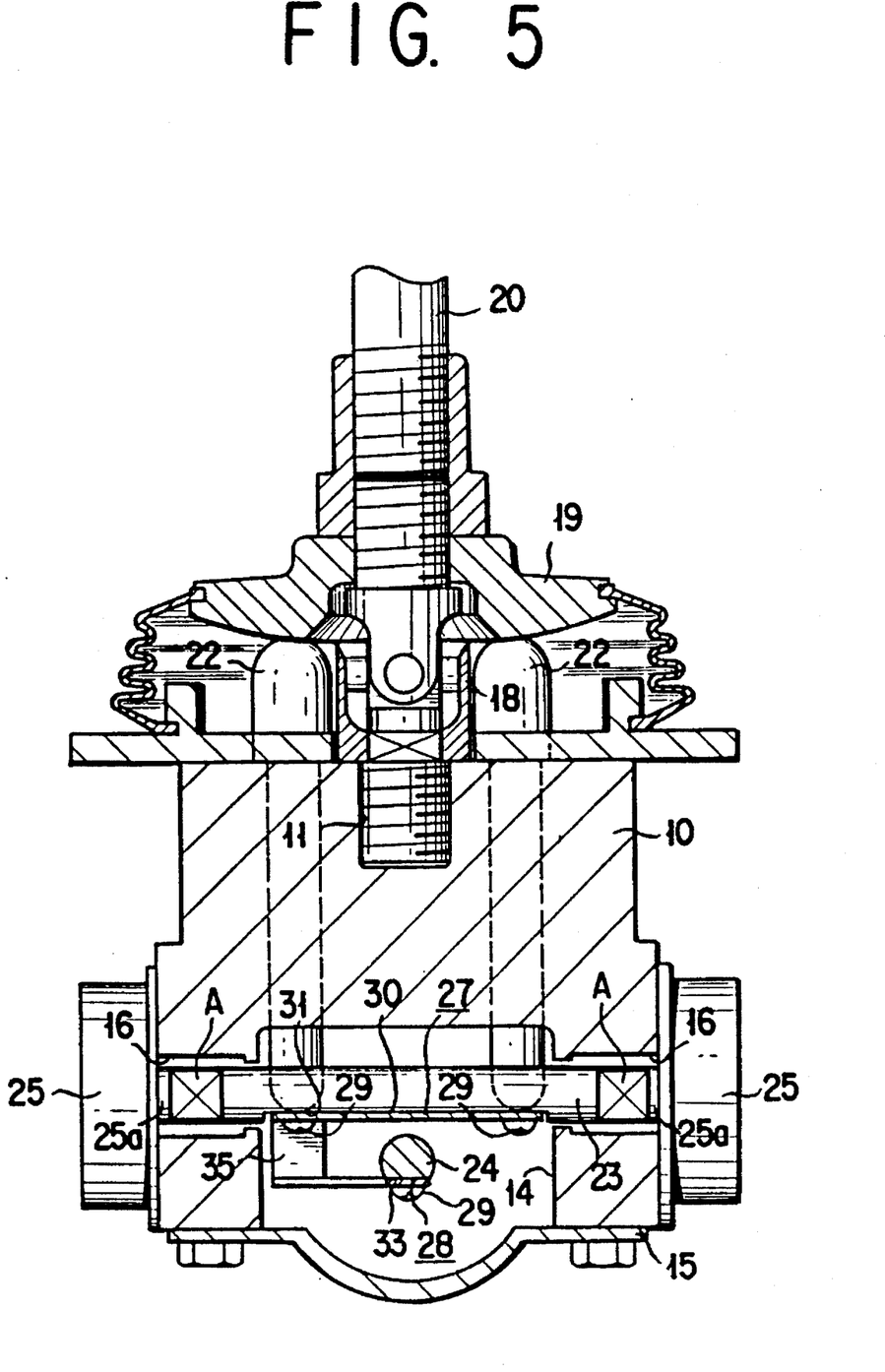
FIG. 5 is a cross-sectional view, taken along line B—B in FIG. 7, in elevation of an operative lever apparatus incorporating a coupling joint according to the present invention.
Figure 6:
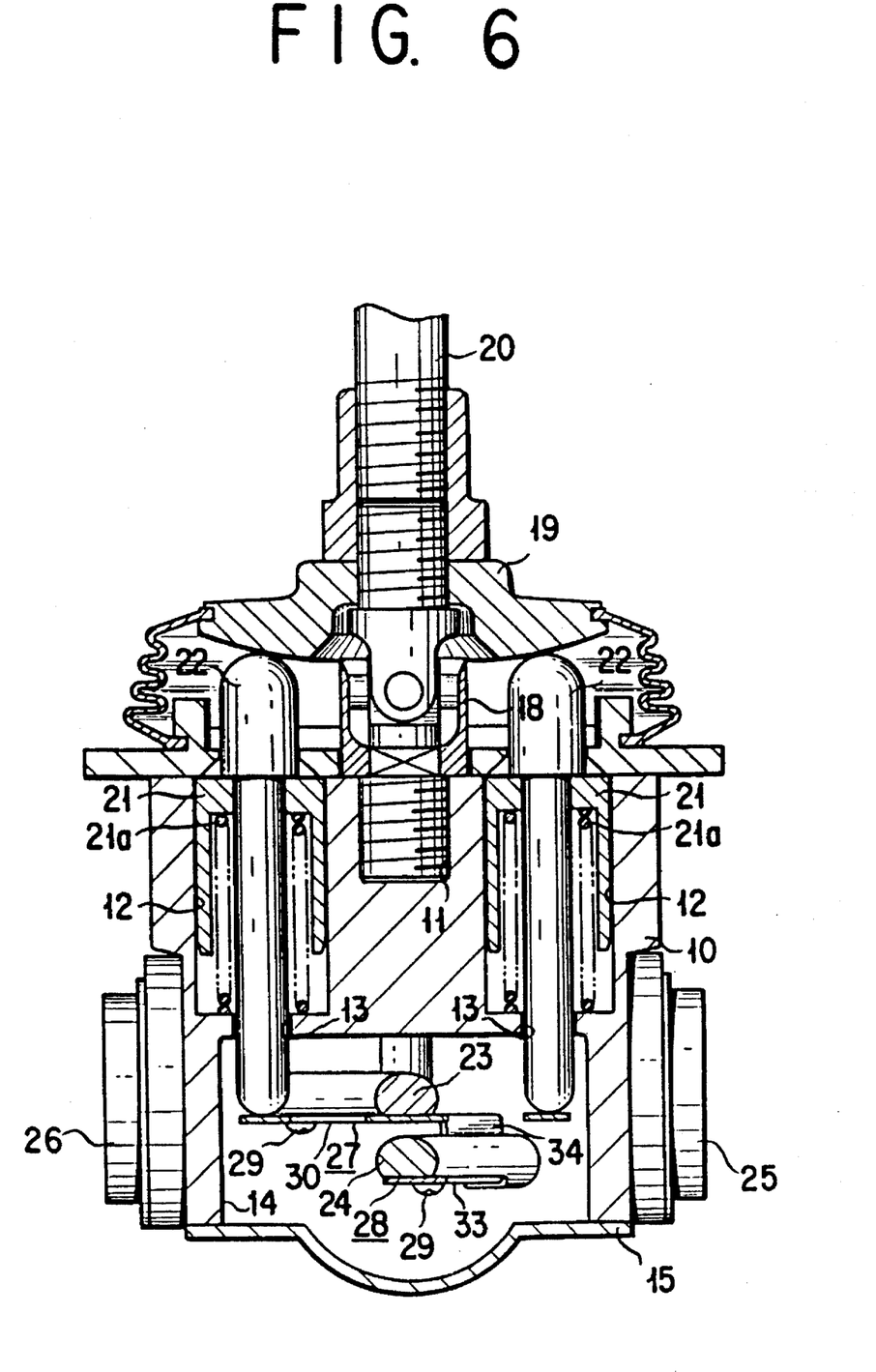
FIG. 6 is another cross-sectional view, taken along the line C—C in FIG. 7, in elevation of the operative lever apparatus of FIG. 5.
Figure 7:
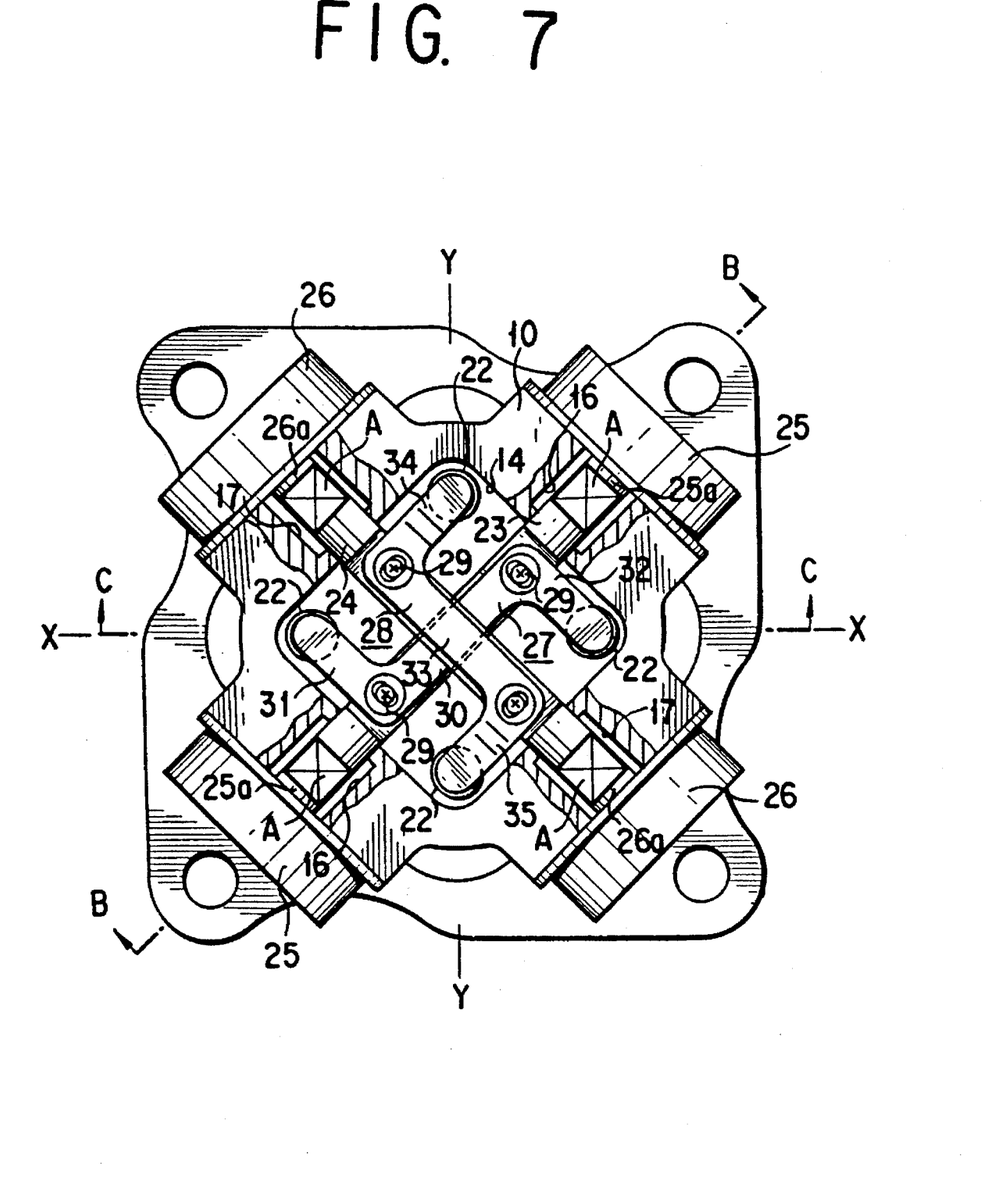
FIG. 7 is a bottom plan view of the operating lever apparatus of FIG. 5.

As shown in FIGS. 5, 6 and 7, a valve body 10 has a mounting threaded hole 11 formed in an upper central portion in an upper surface. Around this threaded hole there are formed four bores 12 which are spaced apart from one another at 90 degree intervals along a common circle. The bottom of each individual bore 12 is open at a hole 13 to a recess 14 that is formed in a lower central portion of the valve body 10. The recess 14 is closed with a cover 15. The valve body 10 also includes a pair of opposing first bores 16 and a pair of opposing second bores 17 formed which each bore open horizontally to the recess 14.

A coupling joint 18, mounted in the threaded hole 11 of the valve body 10, is provided with a dish-shaped disk 19 and a lever 20 so that the disk 19 may be freely inclined in the X direction and in the Y direction with the lever 20. The upper end of a rod 22 is slidably inserted into each of the aforementioned bores 12 via a bush 21 and is urged by the elastic force of a spring 21a to abut the lower surface of the disk 19. The lower end of the aforementioned rod 22 projects through hole 13 into the recess 14.

A first shaft 23 is rotatably supported in the aforementioned pair of first bores 16 whereas a second shaft 24 is rotatably supported in the aforementioned pair of second bores 17. The first shaft 23 and the second shaft 24 are vertically spacedly and are supported so as to intersect with each other at 90 degrees in a horizontal plane. The opposite ends of the first shaft 23 are coupled to the respective rotary shafts of the first rotary angle sensors 25 in the pair via coupling joints A, respectively, whereas the opposite ends of the second shaft 24 are coupled to the respective rotary shafts of the second rotary angle sensors 26 in the pair via coupling joints A, respectively.

Also, the lower surface of a central portion in the longitudinal direction in each of the first and second shafts 23 and 24 is constituted by a flat surface and has secured thereto a receiving member 27 and a second receiving member 28 by means of a screw 29. The first receiving member 27 includes an attaching piece 30, a first side receiving piece 31 and a second side receiving piece 32 which are integrally formed.

The attaching piece 30 is secured to the lower surface of the first shaft 23 with the screw 29, whereas the first side receiving piece 31 and the second side receiving piece 32 project in mutually opposite directions which are orthogonal to the first shaft 23 so as to abut with lower portions of the two rods 22, respectively. More particularly, it will be appreciated that the abutting portion of each of the receiving pieces and each of the rods 22 is biased with respect to the axis of each individual shaft.

Also, the second receiving member 28 includes an attaching piece 33, a first side receiving piece 34 and a second side receiving surface 35 which are integrally formed. The first side receiving piece 34 and the second side receiving piece 35 are each bent in the form of an upward hook. The attaching piece 33 is secured to the lower surface of the second shaft 24 with a screw 29, and the first side receiving piece 34 and the second side receiving piece 35 project in mutually opposite directions which are orthogonal to the second shaft 24 while they are positioned identically with the first side receiving piece 31 and the second side receiving piece 32, respectively, in a vertical direction to abut the respective lower portions of the remaining two rods 22, respectively.

When the lever 20 is inclined to one side in the X direction, one rod is thrust downward by the disk 19 so as to thrust the first side receiving piece 31 or the second side receiving piece 32 of the first receiving member 27, thereby rotating the first shaft 23 by an angle of rotation that is proportional to an angle of inclination of the lever 20. The respective rotary shafts 25a of the first rotary angle sensors 25 will then be rotated to detect the angle of inclination of the lever 20.

Also, when the lever 20 is inclined toward the other side in the Y direction, the first side receiving piece 34 or the second side receiving piece 35 of the second receiving member 28 will be thrust by the rod 22 so as to rotate the second shaft 24, thereby rotating the respective rotary shafts 26a of the second rotary angle sensors 26 in the pair to detect the angle of inclination of the lever 20.

Next, the construction of each coupling joint A will be explained in detail below.

Figure 8:
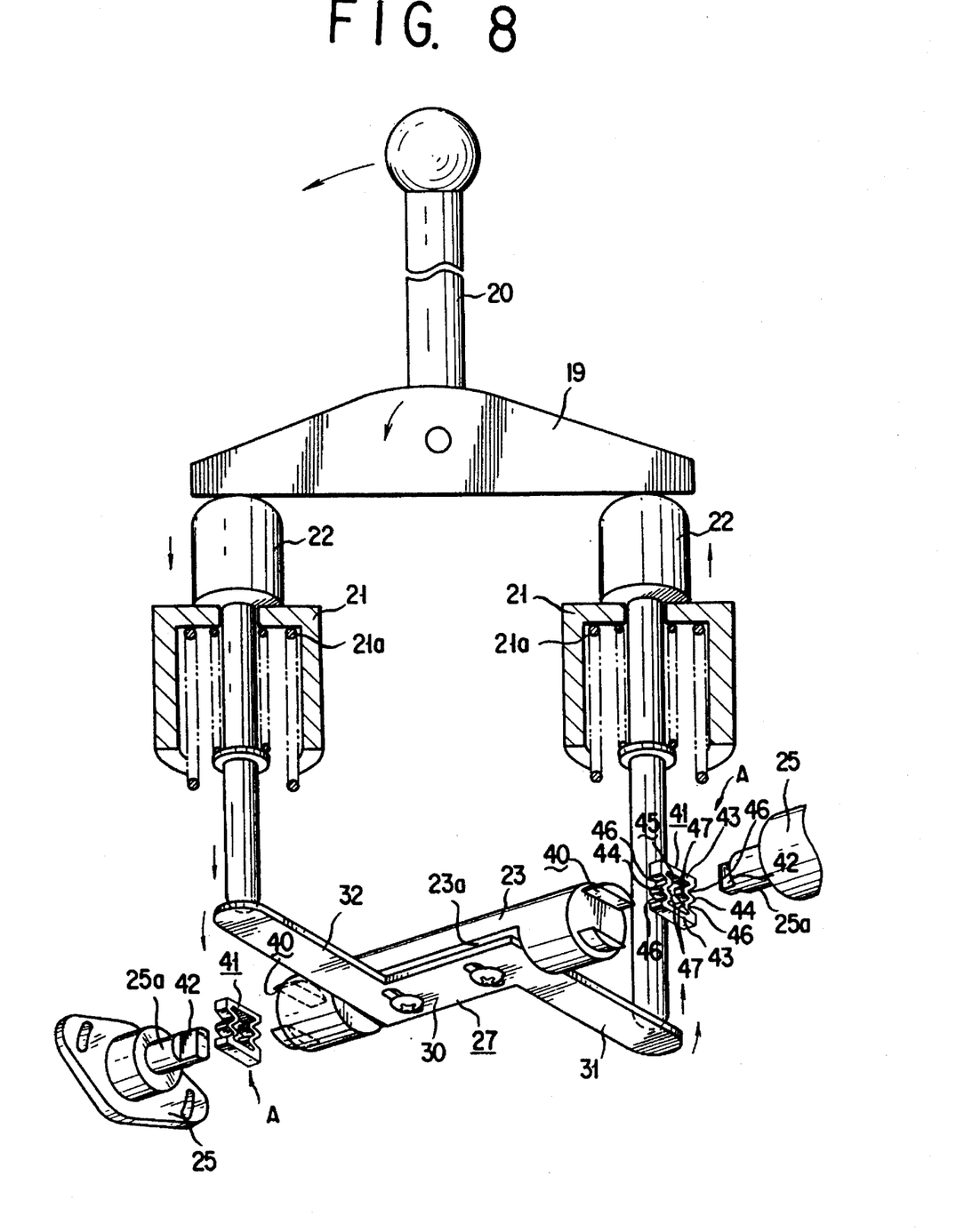
FIG. 8 is a perspective view of the lever apparatus of FIG. 5.
Figure 9:
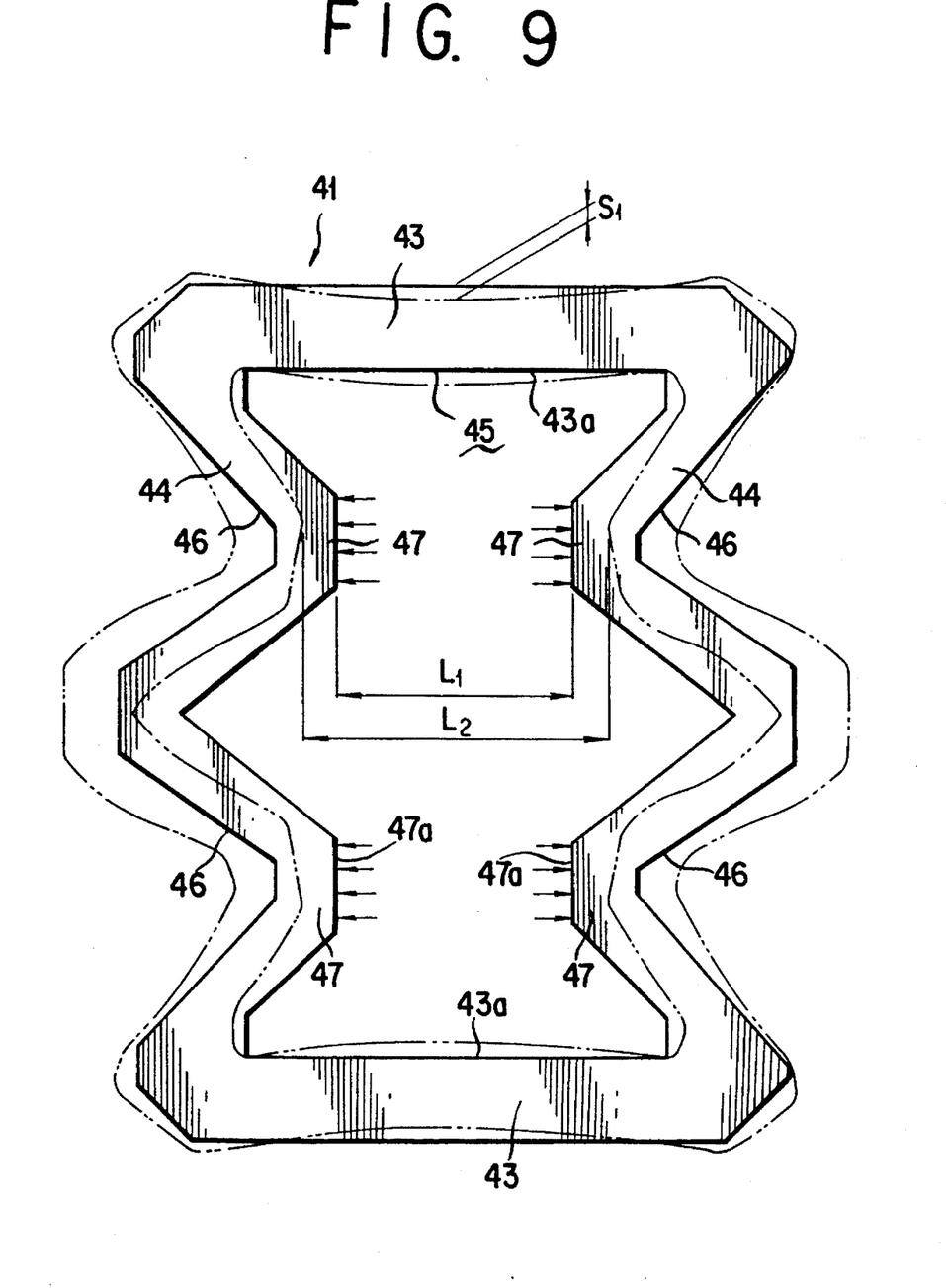
FIG. 9 is a top plan view of the coupling member of the present invention.

In FIG. 8, the coupling joint A is shown as including an engagement recess portion 40 formed on each end portion of the first shaft 23, a coupling member 41 and a projection 42 integrally formed in the rotary shaft 25a of a first rotary angle sensor 25. The coupling 41 is configured, as shown in FIG. 9, so as to have an angular hole 45 constituted by a pair of opposing first sides 43 and a pair of opposing second sides 44. And, the second sides 44 are each bent to form a wave-shaped or zig-zag configuration, having a pair of recesses 46 which are opening outwardly and a pair of projections 47 which are protruding inwardly. The opposing inner faces 47a of the mutually opposing projections 47 and the opposing inner faces 43a of the first sides 43 are arranged to be capable of contacting the respective sides of a rectangle. The respective wave-shapes of the second sides 44 are arranged so that they are symmetrical in configuration about a center dividing line of the coupling member 41.

With each coupling joint of the present embodiment of the invention so constructed, when the projection 42, having a rectangular cross-section, is fitted into the angular hole 45 of the coupling member 41, if the second sides 44, with their inner width L1 are deformed by such an elastic expansion so as to have an expanded width L2, the amount of deformation S1 of the first sides 43 in the pair become extremely small.

Accordingly, if the interference between the angular hole 45 of the coupling member 41 and the projection 42 is made larger, only a small amount of deformation will result so that the coupling member 41 can be fitted in the engagement recess portion 40 with no material or substantial spacing developing between them.

It should be noted that the operative lever apparatus which is provided with a coupling joint according to the present invention, may be any conventional one.

While the present invention has been described with respect to a certain illustrative embodiment thereof, it will readily be appreciated by those skilled in the art that many alterations thereof, omissions therefrom and additions thereto can be made without departing from the essence and the scope of the present invention. Accordingly, it should be understood that the present invention is not limited to the specific embodiment thereof set out above, but includes all possible embodiments thereof that can be made within the scope with respect to the features specifically set forth in the appended claims and encompasses all equivalents thereof.

As has been described hereinbefore, it will be understood that a coupling joint for an operative lever apparatus according to the present invention is extremely useful in a joystick apparatus which has a rotary sensor.

What is claimed is:

1. A coupling member for coupling a rotatable shaft to a rotary shaft of a rotary angle sensor, said coupling member comprising:

a first side having a zig-zag shape;

a second side having a zig-zag shape and being located opposite said first side of said coupling member;

a third linear side connecting a first end of said first side of said coupling member and a first end of said second side of said coupling member;

a fourth linear side, connecting a second end of said first side of said coupling member and a second end of said second side of said coupling member, said fourth linear side being located opposite said third linear side;

wherein said first, second, third and fourth sides of said coupling member define an opening configured to receive a projection extending from a rotary shaft, and said third linear side and said fourth linear side are engageable in a recess formed on a rotatable shaft.

2. The coupling member as claimed in claim 1, wherein:

said first zig-zag side defines a pair of interior flat surfaces for engaging a side of a rectangular projection;

said second zig-zag side defines a pair of interior flat surfaces for engaging a side of a rectangular projection;

said third and fourth linear sides each having interior surfaces for engaging opposite sides of a rectangular projection, respectively; and said third and fourth linear sides each having outer surfaces for engaging opposite interior surfaces of a rectangular recess, respectively.

3. The coupling member as claimed in claim 1, wherein said first and second zig-zag sides are configured so as to be symmetrical about a line extending through the center of the opening and bisecting said third linear side and said fourth linear side.

4. The coupling member as claimed in claim 1, wherein said opening is configured to receive a projection having a rectangular cross-sectional configuration, and said third linear side and said fourth linear side are positioned to correspond with opposite sides of a rectangular recess.

5. The coupling member as claimed in claim 4, wherein said first and second zig-zag sides are configured so as to be symmetrical about a line extending through the center of the opening and bisecting said third linear side and said fourth linear side.

6. A coupling arrangement comprising:

a first rotary shaft having a recess formed in an end thereof;

a rotary angle sensor shaft having a projection extending from an end of said rotary angle sensor shaft, said projection having a rectangular cross-sectional configuration; and a coupling member coupling said first rotatable shaft to said rotary angle sensor shaft, said coupling member comprising:

a first side having a zig-zag shape;

a second side having a zig-zag shape and being located opposite said first side of said coupling member;

a third linear side connecting a first end of said first side of said coupling member and a first end of said second side of said coupling member;

a fourth linear side, connecting a second end of said first side of said coupling member and a second end of said second side of said coupling member, said fourth linear side being located opposite said third linear side;

wherein said first, second, third and fourth sides of said coupling member define an opening into which said projection is received, and said third linear side and said fourth linear side are engaged in said recess.

7. The coupling arrangement as claimed in claim 6, wherein:

said first zig-zag side defines a pair of interior flat surfaces engaging a first side of said rectangular projection;

said second zig-zag side member defines a pair of interior flat surfaces engaging a second side of said rectangular projection, and said second side is opposite said first side;

said third and fourth linear sides each having interior surfaces engaging third and fourth opposite sides of said rectangular projection, respectively; and said third and fourth linear sides each having outer surfaces engaging opposite interior surfaces of said recess, respectively.

8. The coupling arrangement as claimed in claim 6, wherein said first and second zig-zag sides are configured so as to be symmetrical about a line extending through the center of the opening and bisecting said third linear side and said fourth linear side.

9. The coupling arrangement as claimed in claim 6, wherein said recess is rectangular in shape and said third linear side and said fourth linear side closely correspond with opposite sides of said rectangular recess.

10. The coupling arrangement as claimed in claim 9, wherein said first and second zig-zag sides are configured so as to be symmetrical about a line extending through the center of the opening and bisecting said third linear side and said fourth linear side.

* * * * *